Figure 1:
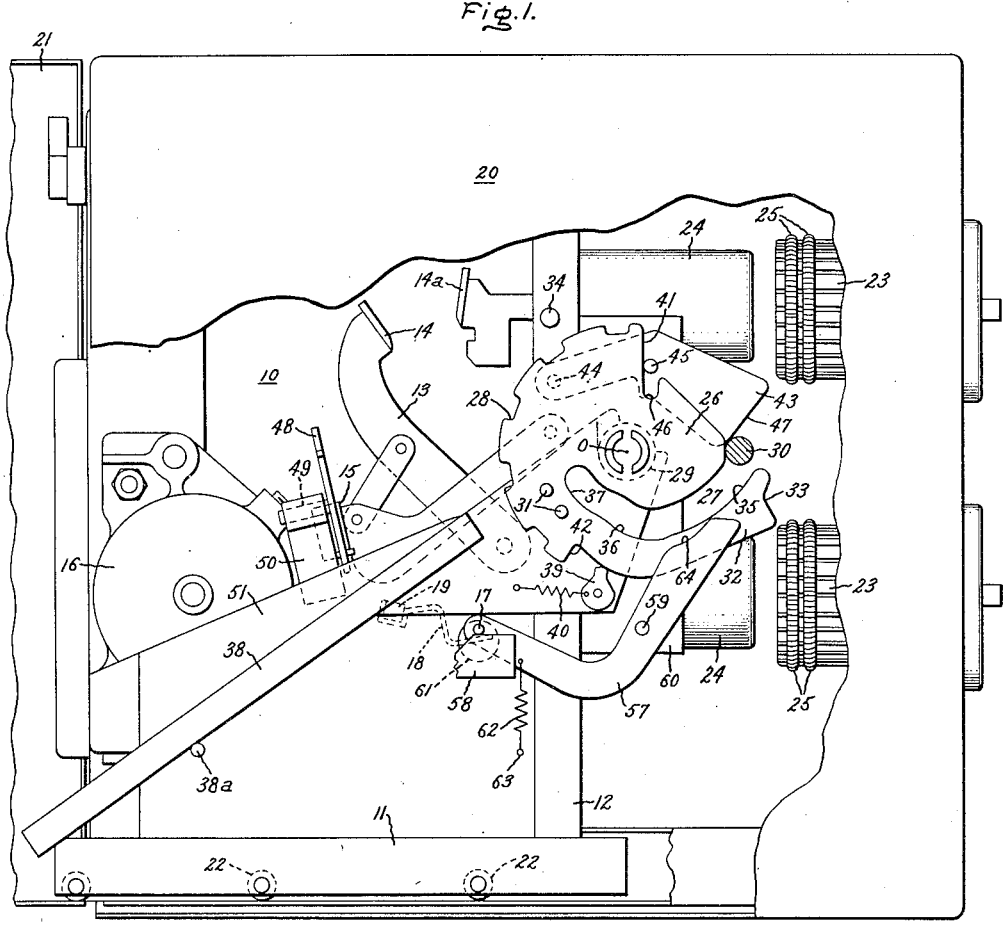

Jan. 1, 1957 V. N. STEWART ET AL 2,776,346
DRAWOUT MECHANISM FOR METAL ENCLOSED ELECTRIC SWITCHGEAR
Filed Dec. 31, 1953 3 Sheets-Sheet 1

Inventors:
Vincent N. Stewart,
Max B. Fornwalt,
by J. Wesley Faulkner
Their Attorney.

Jan. 1, 1957 V. N. STEWART ET AL 2,776,346
DRAWOUT MECHANISM FOR METAL ENCLOSED ELECTRIC SWITCHGEAR
Filed Dec. 31, 1953 3 Sheets-Sheet 2

Inventors:
Vincent N. Stewart,
Max B. Fornwalt,
by J. Wesley Haubner
Their Attorney.

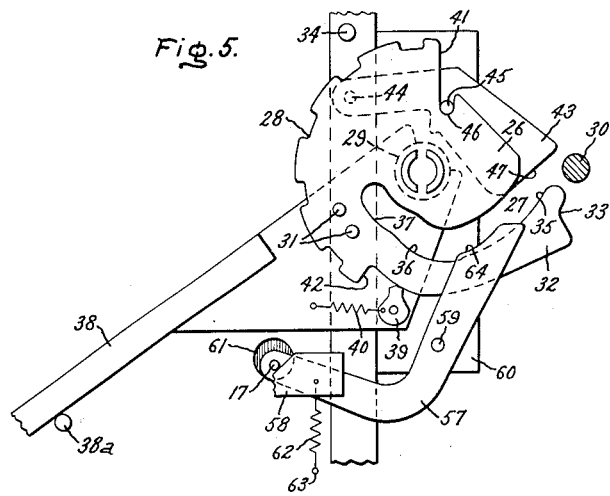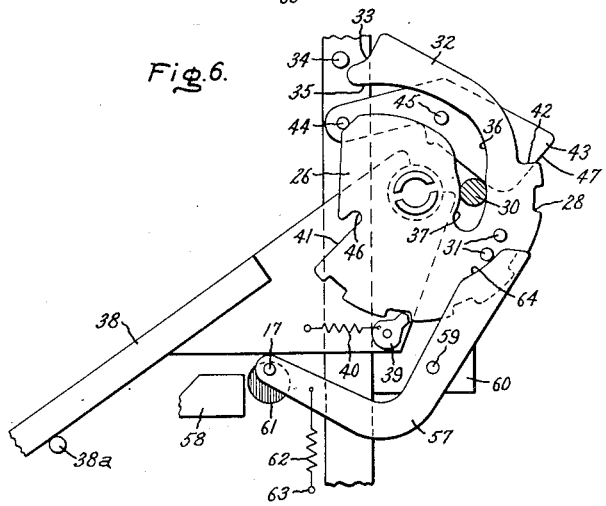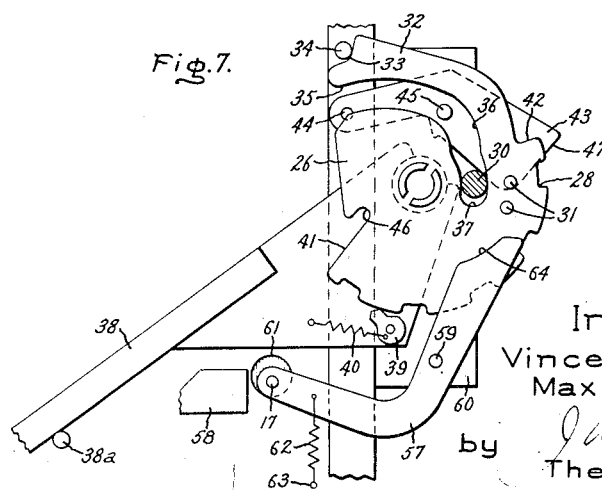

United States Patent Office 2,776,346
Patented Jan. 1, 1957

2,776,346

DRAWOUT MECHANISM FOR METAL ENCLOSED ELECTRIC SWITCHGEAR

Vincent N. Stewart and Max B. Fornwalt, Springfield, Pa., assignors to General Electric Company, a corporation of New York Application December 31, 1953, Serial No. 401,493

15 Claims. (Cl. 200—50)

Our invention relates to improvements in drawout mechanism for metal-enclosed electric switchgear, and more particularly to drawout mechanism including a rotatable slotted cam mechanism as a force amplifying means for inserting and withdrawing a movable circuit breaker unit into and out of a stationary enclosure unit.

Large electric circuit breakers are commonly housed in grounded metal enclosures to provide maximum safety for operators and equipment. Normally such circuit breakers are made removable from their enclosures to provide maximum accessibility for maintenance with minimum interruption of service. Typically, a movable circuit breaker unit is provided with movable disconnect contacts cooperably engageable with stationary disconnect contacts located in an enclosure unit or cubicle to form a suitable path for current flow. Where high current ratings are required the cooperating disconnect contacts must be designed to have good, pressure-loaded contact to prevent power loss at the joint thereby formed. However, the disconnect contacts are never designed for circuit making or breaking duty.

The movable circuit breaker unit must be provided with a drawout mechanism suitable for driving the unit to and from its connected position inside the enclosing cubicle. Two problems involved in the design of such a mechanism are: (1) the force required to drive the movable unit varies, particularly at the point of engagement between the movable and the stationary disconnect contacts, and (2) the circuit interrupting switch contacts of the movable circuit breaker unit must be open, and the electric circuit therefore broken, before the movable unit can be inserted or withdrawn, because of the insufficiency of the movable disconnect contacts and stationary disconnect contacts for making or interrupting current flow.

There are further subdivisions of problem (2) as follows:

Although interlock means to prevent the circuit breaker from closing must be available throughout the travel of the movable unit, the interlock means must be inactive and the circuit breaker permitted to close in the final, fully inserted operating position. There is a critical point in the travel of the movable unit before which the circuit breaker must be tripped open and after which it must be ready for normal closing and tripping operation.

An interlock means which opens the circuit breaker upon an attempted operation of the drawout mechanism is not completely satisfactory because it may disrupt circuit continuity when in the hands of an inexperienced operator.

Operating a tripping device of the circuit breaker does not necessarily assure that the circuit interrupting switch contacts are open. In some unusual circumstance the switch contacts may be welded closed.

In addition, any interlock means must be completely automatic and as fool-proof as possible to eliminate the element of human error.

An object of our invention is to provide an improved interlock means for a movable circuit breaker unit provided with a rotatable slotted cam drawout mechanism to insure that the circuit breaker remains tripped throughout the travel of the movable unit into and out of an enclosure unit.

Another object of our invention is to provide an improved interlock means to prevent operation of the drawout mechanism either to insert or to withdraw the movable unit until the circuit breaker has been positively opened.

Still another object is to provide improved force amplifying characteristics in a rotatable slotted cam drawout mechanism.

In carrying out our invention in one form a drawout type circuit breaker unit movable into and out of a stationary enclosure unit is provided with a rotatable slotted cam actuating mechanism disposed in driving relation between the movable breaker unit and the stationary enclosure unit. Preferably the rotatable cam is mounted on the movable unit and is provided with a cam slot engaging a fixed pin on the enclosure. The cam slot is of generally involute configuration about the center of cam rotation, and is open at one end to permit complete removal of the movable unit from the enclosure. In order to vary the amount of force amplification at successive points in the linear travel of the movable unit, the cam slot is provided along its length with adjacent sections of varying radial slope, i. e. rate of change of radial distance from the center of cam rotation to the camming surface of the slot per degree of cam rotation.

A closed end section of the cam slot is concentric about the cam center and therefore has zero radial slope. This section is employed in conjunction with an improved movable interlock member to control tripping of a circuit breaker carried by the circuit breaker unit.

A positive interlock means is also provided to control directly the drawout mechanism. Another movable interlock member is mounted to prevent effective movement of the rotatable actuating cam whenever the circuit breaker switch contacts are closed, whether the movable circuit breaker unit is withdrawn or inserted.

Figure 2:
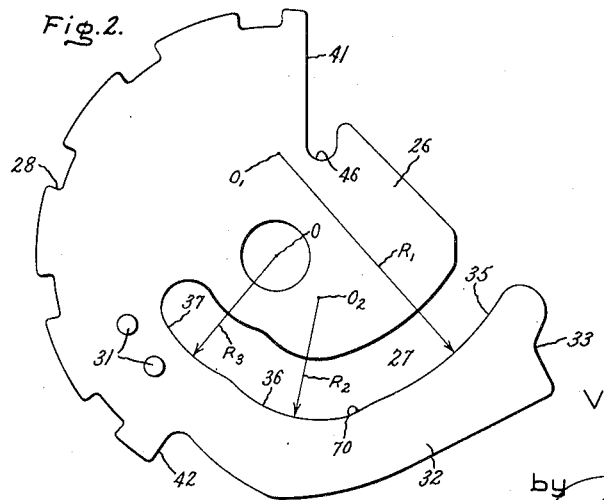
Figure 3A:
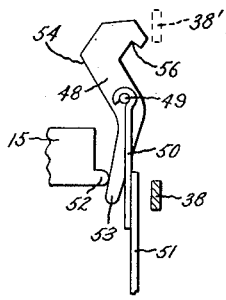
Figure 3B:
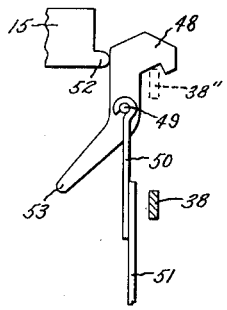
Figure 4:
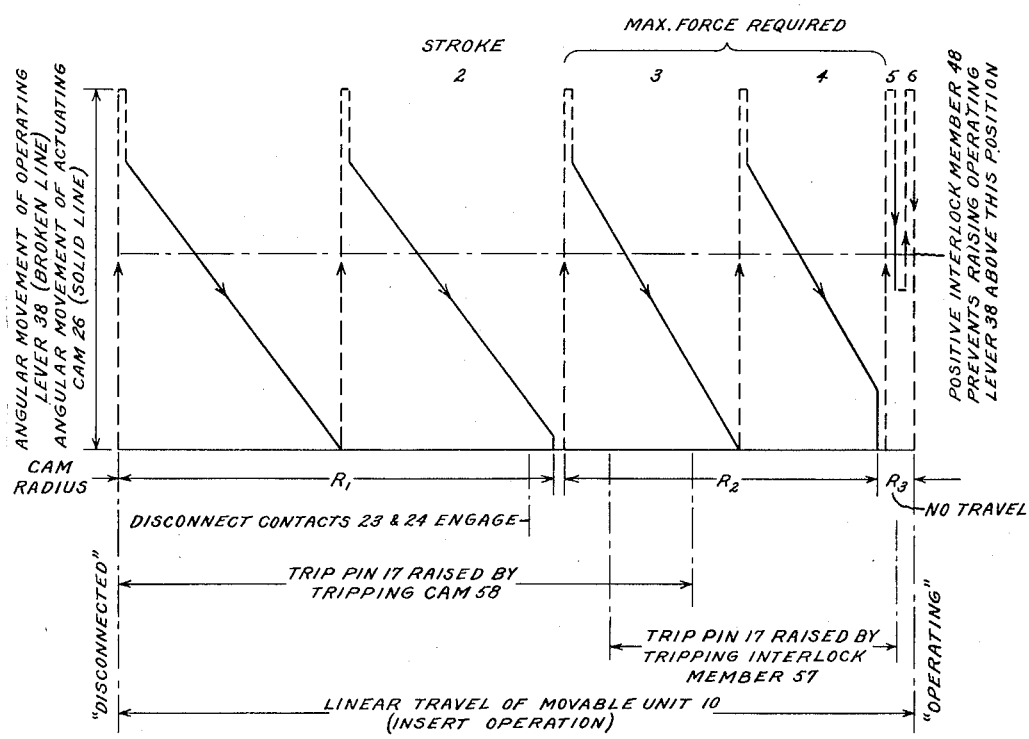

Other objects and advantages of the invention will be apparent during the course of the following description, in which Figure 1 is a side view of a movable circuit breaker unit enclosed in a stationary enclosure unit with the near side of the enclosure partially removed in order more clearly to show the detailed structure and arrangement of the preferred form of the rotatable slotted cam drawout mechanism with improved features. Figure 2 is a detail view of the rotatable slotted cam. Figure 3a and 3b are detailed front views of an interference catch that positively prevents operation of the drawout mechanism whenever the circuit breaker is closed, with Figure 3a showing the circuit breaker in its open position and Figure 3b showing the circuit breaker in its closed position. Figure 4 is a graphical representation of certain operating characteristics of the drawout mechanism at successive stages of its insertion travel. Figures 5, 6 and 7 are schematic side views showing the relative positions of the various operating parts of the drawout mechanism as the circuit breaker unit is moved into its enclosing cubicle.

As shown in Figure 1, a movable circuit breaker unit, indicated generally by reference character 10, includes a movable carriage 11. The carriage 11 supports a suitable frame structure 12 upon which is mounted a circuit breaker 13. The circuit breaker 13 may be of any type, but as shown includes movable and stationary circuit interrupting switch contacts 14 and 14a respectively and a movable switch member 15 carrying the movable contacts 14, similar to the improved type circuit breaker more fully described in Patent No. 2,581,181, issued January 1, 1952, to John A. Favre. The circuit breaker shown is arranged to be closed by an energy storing motor driven mechanism 16 of the improved type more fully disclosed and claimed in Patent No. 2,667,076, issued to John A. Favre on January 26, 1954. A tripping device is provided and includes a movable trip pin 17 connected by linkage 18 to a trip latch shaft 19. While the tripping mechanism itself is not shown, it will be understood that counterclockwise tilting of shaft 19 as caused by the raising of trip pin 17 not only effects tripping of the circuit breaker 13 but also results in trip-free operation of the breaker 13 upon any subsequent attempted closing operation.

The movable circuit breaker unit 10 is disposed in an enclosure unit or cubicle 20 having a vertically hinged door 21, shown open in Figure 1. Rollers 22 are provided to slidably support the carriage 11. Stationary disconnect contacts 23 are provided in the back wall of the enclosing cubicle 20 suitable for engagement with cooperating movable disconnect contacts 24 projecting from the back of the movable unt 10. When engaged, the stationary disconnect contacts 23 and the movable disconnect contacts 24 provide a path for current flow. As shown, the stationary contacts 23 are composed of a plurality of resilient conducting fingers in annular socket form compressed together by means of the encircling springs 25 thereby to establish a firm conducting pressure engagement around the tubular movable contacts 24. This pressure engagement inherently results in a considerable frictional load during movement of the movable unit 10, and a materially increased force amplification is required to drive the movable unit 10 into and out of the enclosing cubicle 20 while the disconnect contacts 23 and 24 are engaged.

The required force amplification is obtained by means of an improved drawout actuating mechanism similar to that described and claimed in its broader aspects in Patent No. 2,702,324 issued on February 15, 1955, to Warren J. Donaldson. The improved mechanism employs a rotatable disk-like actuating cam member 26 having an open ended generally involute cam slot 27 and a series of circumferentially spaced two-way ratchet elements 28. A shaft 29 extends across the back of the movable unit 10 and is rotatably supported in suitable bearing brackets secured to frame 12. Each end of the shaft 29 carries an actuating cam member 26 suitably fixed to the shaft so that both members produce balanced camming forces when rotated jointly about their centers of cam rotation O, which are on the axis of shaft 29. The open end of the cam slot 27 will engage and disengage a stationary pin 30 fixedly mounted on the side of the stationary enclosure unit 20. When the actuating cam member 26 is rotated while the cam slot 27 is engaged by pin 30, the movable unit 10 will travel into and out of the enclosure unit 20 due to the camming action of the generally involute shaped cam slot 27.

The configuration of the rotatable actuating cam member 26 can be seen clearly in Figure 2. A pair of holding pins 31 extend transversely from the flat surface of the disk-like cam member 26, and their significance will be brought to light later during the description of the interlocks. Adjacent to the outer side of the open ended generally involute cam slot 27 the cam member 26 forms a finger 32 which terminates with a shoulder 33 at its extremity. When the cam member 26 is rotated to the position shown in Figure 7 the shoulder 33 will engage stop pin 34 which is rigidly mounted on frame 12 of the movable unit 10. As shown in Figure 2, the camming slot 27 is generally involutely shaped in a manner to provide varying degrees of force amplification at various points in the linear travel of the movable circuit breaker unit 10. The camming surface of slot 27 is composed of adjacent sections, each section being circular about a different center. A final slot section 37 is concentric about the center of cam rotation O, while the remaining camming sections have centers located eccentric to the center of cam rotation O. An initial camming section 35 located adjacent the open end of slot 27 has a center $O_1$ and a radium $R_1$. Because center $O_1$ is a relatively great distance from the center of cam rotation O the rate of change of radial distance between the center of cam rotation O and successive points along the surface of camming section 35 per degree of cam rotation is high, or it can be said that camming section 35 has a steep radial slope. The steep radial slope results in relatively great linear movement of movable unit 10 per degree of cam 26 rotation and a relatively low force amplification. An interior intermediate camming section 36 of slot 27 has a center $O_2$ and a radius $R_2$. Center $O_2$ is relatively close to the center of cam rotation O and therefore camming section 36 has a gradual radial slope resulting in a smaller linear movement per degree of cam rotation and a greater force amplification. The final or closed end section 37 of cam slot 27 has a radius $R_3$ and a center coincident with the center of cam rotation O, and therefore section 37 is concentric and has a zero radial slope. Accordingly, no linear travel of movable unit 10 results from final rotation of cam member 26. A minor portion 70 of the surface of camming slot 27 located between the initial and intermediate camming sections, 35 and 36, respectively, is also formed concentric about the center of cam rotation O with a zero radial slope and furnishes a transposition from the steep radial slope of section 35 to the gradual radial slope of section 36.

Referring again to Figure 1, a manually operable actuating lever 38 is located adjacent one cam member 26 and is pivoted at one end on shaft 29. The lever 38 extends to the front of the enclosing cubicle 20 and is operated therefrom. When not in operation, lever 38 is urged by the force of gravity to rest on stop pin 38a. The pivoted end of the lever 38 is generally triangular in shape and carries a pivotally mounted reversible pawl 39 to engage with the series of two way ratchet elements 28 formed on the circumference of the rotatable cam member 26. A biasing spring 40 is provided to bias the pawl 39 to a normal mid-position, as shown in the drawing. Oscillation of the actuating lever 38 will cause the pawl 39 to engage successively the ratchet elements 28 to rotate the cam member 26 progressively in either direction. The pawl 39 will automatically reverse at ends 41 or 42 of the series of ratchet elements 28 in the recesses provided in the circumference of the cam member 26 at these points.

A latch member 43 is pivotally mounted on a pin 44 extending from the frame 12 and carries a latching pin 45 into a cooperating notch 46 provided on the rotatable cam member 26 thereby holding the cam member 26 in a predetermined position wherein the stationary pin 30 will enter the open end of the cam slot 27 when the movable circuit breaker unit 10 is rolled into the enclosure 20 during an insert operation. This position of the cam member 26 is shown in Figure 5. The latch member 43 is provided with an integral cam surface 47 for engaging with the stationary pin 30 when the movable unit 10 is rolled into the enclosure 20 thereby raising the latch member 43 to its released position in readiness for operation of the drawout mechanism, as shown in Figure 1.

Positioned adjacent to the path of movement of the manually operable actuating lever 38 is a movable interlock member 48 shown as a hook-shaped interference catch pivotally mounted intermediate its ends upon a pin 49 carried by a bracket 50 fixed to a side wall 51 of the movable unit 10. See Figure 3. The interference catch 48 is also positioned in slidable engaging relationship to the movable switch member 15 carrying the movable circuit interrupting switch contacts 14 of the circuit breaker 13 so that a protuberance 52 of the switch member 15 engages the tail 53 of the interference catch 48 when the circuit breaker 13 is open, as shown in Figure 3a; and so that the protuberance 52 engages the crown 54 of the catch 48 when the switch member 15 is raised to close the switch contacts 14 and 14a of the circuit breaker 13, as shown in Figure 3b. As can be seen from Figure 3a, when the circuit breaker is open, the interference catch 48 is pivoted counterclockwise clear of the path of movement of the operating lever 38, thereby permitting lever 38 to be raised to position 38' which is at the full height of its oscillation. Figure 3b reveals that when the circuit breaker is closed catch 48 is pivoted to a position directly blocking the normal oscillation of the actuating lever 38, wherein the eye 56 of catch 48 will positively prevent raising lever 38 above position 38". The movable interlock member 48 therefore is a positive interlock member assuring that the switch contacts 14 and 14a are open before effective operation of the drawout mechanism can begin for inserting or withdrawing the movable circuit breaker unit 10.

To insure that the circuit breaker 13 remains open during critical portions of its inserting or withdrawing travel, we provide a second movable interlock member 57 cooperating with a fixed cam 58 located on the stationary enclosure 20 to operate on trip pin 17. Referring to Figure 1, in preferred form this latter interlock member is formed as a tripping crank 57 pivoted intermediate its ends upon a pin 59 carried by a support 60 fixed to the frame 12 of the movable unit 10. One end of the tripping crank 57 is suitably connected to the movable trip pin 17 extending through a hole 61 in side wall 51 of the movable unit 10. The tripping crank 57 is biased downwardly at this end by spring 62 pinned to side wall 51 at 63 thereby tilting the tripping crank 57 in a counterclockwise direction to a position wherein trip pin 17 rests at the bottom of the hole 61, as viewed in Figures 5 and 7. The other end of the tripping crank 57 has an integral cam surface 64 for engaging the pair of holding pins 31 located on the rotatable cam member 26. When the cam member 26 is in a suitable angular position, such as shown in Figure 6, holding pins 31 engage surface 64 and the interlock member 57 is tilted clockwise to a tripped position wherein trip pin 17 is raised and, through linkage 18, trip latch shaft 19 is tilted counterclockwise and held in its tripped and trip-free position. The stationary tripping cam 58 is fixedly mounted on a side wall of enclosure 20 in a suitable position to engage with trip pin 17. For a portion of the travel of the movable unit 10 into and out of the enclosure 20, trip pin 17 will ride over cam 58. The trip pin 17 thus raised acts through linkage 18 to tilt the trip latch shaft 19 to trip the circuit breaker 13. When the trip pin 17 is neither engaged by the stationary tripping cam 58 nor held in its tripped position by the pivoted tripping crank 57, it will reside at the bottom of hole 61, due to the action of biasing spring 62, and in this position the circuit breaker 13 can be closed.

From the foregoing detailed description of the structure of our drawout mechanism its mode of operation may now be readily followed. The drawout mechanism provides the driving force for linear travel of the movable unit 10 between two positions; a completely "disconnected" position as shown in Figure 1, in which the movable disconnect contacts 24 and the stationary disconnect contacts 23 are entirely disengaged and in which the circuit breaker 13 is electrically isolated from any power source that may be connected to the stationary contacts 23, and an "operating," fully connected position as shown in Figure 7, in which the movable disconnect contacts 24 and the stationary disconnect contacts 23 are fully engaged and the circuit breaker 13 is capable of normal operation. To reach the disconnected position the movable unit 10 can be rolled freely into the enclosure unit 20 until the actuating cam 26 at the open end of cam slot 27 stops against the stationary pin 30. The latch member 43 is raised to its released position by the camming action of surface 47 against pin 30, thereby permitting rotation of the cam member 26.

To insert the movable unit, starting at the "disconnected" position, the manually operable actuating lever 38 is oscillated from the front of the enclosure 20 in a vertical plane for six strokes, as indicated on graphical diagram Figure 4. The normal angular movement of operating lever 38 is stopped in its clockwise direction by the pivoted end 44 of the latch member 43, and in its counterclockwise direction by the stop pin 38a. Raising the lever 38 for the first stroke causes the pawl 39 to tilt clockwise and to engage with the end element of the two way ratchet elements 28. Lowering the lever 38 rotates the actuating cam 26 in the counterclockwise direction to produce a camming action between the generally involute cam slot 27 and the stationary pin 30 thereby drawing the movable unit 10 into the enclosing cubicle 20. By repeated oscillation or strokes of the operating lever 38, a progressive rotation of member 26 is obtained which is translated into linear travel of movable unit 10 into enclosure 20. Near the end of the second stroke of the operating lever 38, the movable disconnect contacts 24 reach the stationary disconnect contacts 23 and beginning at this point an increased amplifying force is required to force the inter-engagement of the movable contacts 24 with the spring loaded conducting fingers of the stationary contacts 23. The radial slope of the generally involute camming slot 27 is reduced at interior camming section 36 so that during strokes 3 and 4 of lever 38 a maximum force amplification is achieved. The concentric transposition portion 70 of the camming slot 27 between camming sections 35 and 36 engages with the stationary pin 30 at the end of the second stroke of lever 38, and at this point the line of force interacting between the pin 30 and the cam member 26 is directed through the center of cam rotation O. Thus, "back-tracking" by the movable unit 10 during the time that the operating lever 38 is being raised for the third stroke is substantially eliminated. In addition, the reduced radial slope of camming section 36 decreases any "back-track" tendency of the movable unit 10 during strokes 3 and 4 of lever 38 caused by the spring pressure of the stationary contacts 23 engaging the movable contacts 24.

Near the end of the fourth stroke of the operating lever 38 the movable disconnect contacts 24 and the stationary disconnect contacts 23 reach their fully engaged position, while rotatable cam member 26 reaches an angular position wherein stationary pin 30 is engaged with the closed end, concentric section 37 of cam slot 27 as shown in Figure 6. Further rotation of cam 26 will cause no corresponding linear travel of the movable unit 10 due to the zero radial slope of concentric slot section 37. During the fifth stroke of lever 38 counterclockwise rotation of cam member 26 is stopped by contact between shoulder 33 of the cam member 26 and stop pin 34, as shown in Figure 7. When the cam member 26 stops, downward movement of the operating lever 38 is halted with the lever 38 assuming an approximately horizontal position midway between the extremities of its normal oscillating path. In this position lever 38 extends out the front of the enclosing cubicle 20 thereby interfering with and preventing closure of the cubicle door 21. Upon raising the lever 38 for its final stroke, pawl 39 reaches the recess at point 41 of the cam member 26 and is biased to a mid-position by bias spring 40. Subsequent lowering of the lever 38 causes the pawl 39 to reverse by tilting counterclockwise as it passes over the first element at end 41 of the series of two way ratchet elements 28. The movable unit 10 is now in its "operating" position and suitable for withdrawal as shown in Figure 7.

To withdraw the movable unit 10 from its enclosure 20, the operation of the drawout mechanism is essentially similar to but reverse from the insert operation. Each upward oscillation of the operating lever 38 rotates the actuating cam 26 in a clockwise direction, while each downward oscillation permits the pawl 39 to engage with a succeeding element of the two-way ratchet elements 28. Clockwise rotation of cam 26 is halted in the disconnected position of movable unit 10 by contact between point 41 of the cam member 26 and latching pin 45. The final downward oscillation of lever 38 permits pawl 39 to return to its mid-position in the recess at point 42 of the rotatable member 26 and thereby to stand ready for the next insert operation as shown in Fgure 1. Removal of the movable unit 10 from the enclosure unit 20 will cause latch member 43 to lower as its surface 47 withdraws from stationary pin 30 and latching pin 45 will engage with notch 46 thereby preventing rotation of cam member 26 which is now in its proper angular position wherein pin 30 will engage the open end of cam slot 27 upon reinsertion of the movable unit 10.

The drawout mechanism described above cannot be operated at any time the circuit breaker 13 is closed, due to interference by the positive interlock member 48. In the closed circuit position of circuit breaker 13, as shown in Figure 3b, the movable switch member 15 engages the crown 54 of interference catch 48 in a manner to tilt the catch 48 into the path of oscillation of the manually operable actuating lever 38. When attempting an insert operation with the circuit breaker 13 closed, the lever 38 can be raised only to a position 38" that is insufficient to allow the pawl 39 to engage with a ratchet element 28 thereby preventing rotation of the cam member 26 and preventing linear travel of the movable unit 10. The positive interlock likewise prevents withdrawal of the movable unit 10 from its "operating" position when the circuit breaker 13 is closed. Interference catch 48 will stop lever 38 at position 38", thereby confining rotation of cam member 26 with respect to stationary pin 30 to a portion of the concentric slot section 37 wherein no linear travel is imparted to the movable unit 10. Upon returning the lever 38 to its lowest position, pawl 39 will not engage with the succeeding ratchet element 28 due to the previous insufficient rotation of cam member 26, and further oscillation of the lever 38 will have no effect.

The circuit breaker 13 cannot be closed at any time during insert or withdrawal travel of the movable unit 10 because of the interlock features of the stationary cam 58 and movable interlock member 57 in combination with trip pin 17. Whenever the trip pin 17 is in its raised position at the top of hole 61, the circuit breaker 13 will be open and trip-free due to the counterclockwise tilting of trip latch shaft 19 by linkage 18. Figure 5 shows the positions of the interlock elements before the movable circuit breaker unit 10 has been rolled into its "disconnected" position. Bias spring 62 holds trip pin 17 at the bottom of hole 61, thereby permitting closure of the circuit breaker 13 and trip pin 17 has not yet come into contact with stationary tripping cam 58. Upon rolling the movable unit 10 into its "disconnected" position, trip pin 17 engages stationary cam 58 and is raised thereby. This position is shown in Figure 1, and the circuit breaker 13 is now known to be tripped. As the movable unit 10 travels toward its "operating" position during insertion, trip pin 17 rides over the top of stationary cam 58. During the third stroke of the lever 38 the trip pin 17 travels beyond the stationary cam 58 and is free to return to the bottom of hole 61. However, as shown by graphical diagram Figure 4, before this point of linear travel has been reached the actuating cam 26 arrives at an angular position in which the pair of holding pins 31 engage the cam surface 64 of tripping crank 57 thereby holding the interlock member 57 in its tripped position wherein trip pin 17 is held in its raised position. Linear travel of the movable unit 10 terminates during stroke four of lever 38, as shown by Figure 4. Figure 6 illustrates the relative position of the various parts of the drawout mechanism at this stage in the insert operation of the movable unit 10. During the rotation of cam 26 corresponding with stroke five of lever 38, holding pins 31 disengage from surface 64 of tripping crank 57 thereby releasing trip pin 17 which is returned to its lower position by bias spring 62. This sequence of operation eliminates the critical and accurate adjustment between the movable circuit breaker unit 10 and the stationary cam 58 required when the stationary cam 58 alone is used as a tripping interlock means. Figure 7 shows the relative positions of the interlock elements with the movable unit 10 in its "operating" position. The circuit breaker 13 now can be closed. During withdrawal of the movable unit 10, the operation of this tripping interlock is reversed. As described above, the positive interlock prevents withdrawal of the movable unit 10 from its "operating" position until circuit breaker 13 has been tripped open. During rotation of the cam member 26 through its concentric slot section 37, before linear travel of the movable unit 10 begins, holding pins 31 come into engagement with the cam surface 64 of tripping crank 57 thereby holding the interlock member 57 in its tripped position wherein trip pin 17 is raised and trip latch shaft 19 is tilted to its tripped and trip-free position. Trip pin 17 will not permit closing of the circuit breaker 13 until the movable unit 10 is withdrawn beyond the "disconnected" position to a point wherein trip pin 17 has disengaged from the stationary cam 58.

While we have shown and described a preferred form of our invention by way of illustration, many modifications will occur to those skilled in the art. For example, the respective locations of the rotatable actuating cam member 26 on the movable circuit breaker unit 10 and the stationary pin 30 on the stationary enclosure unit 20 might be reversed, if desired, with suitable rearrangement thereof to maintain the same principles of operation. Furthermore, the actuating cam member 26 might be rotated by electrical, hydraulic, or other suitable actuating means in place of the manually operable means described herein. We therefore contemplate by the appended claims to cover all such modifications as fall within the true spirit and scope of our invention.

What we claim as new and desire to secure by Letters Patent of the United States is:

1. A drawout electric switchgear mechanism comprising, an enclosure unit and a circuit breaker unit mounted for relative reciprocal movement to provide for insertion and withdrawal of said circuit breaker unit with respect to said enclosure unit, a rotatable actuating cam pivotally mounted upon one said unit and having a generally involute camming slot therein, a pin fixedly mounted upon the other said unit and disposed for engagement in said slot in driving relation thereby to provide relative movement of said enclosure and circuit breaker units as said cam is rotated, said generally involute slot having at least two adjacent camming sections of different radial slopes, and actuating means for rotating said cam.

2. A drawout electric switchgear mechanism comprising, an enclosure unit and a circuit breaker unit mounted for relative reciprocal movement to provide for insertion and withdrawal of said circuit breaker unit with respect to said enclosure unit, a rotatable actuating cam pivotally mounted upon one said unit and having a generally involute open-ended camming slot therein, a pin fixedly mounted upon the other said unit and disposed for engagement in said slot in driving relation thereby to provide relative linear movement of said enclosure and circuit breaker units as said cam is rotated, said generally involute slot having a first camming section adjacent said open end provided with a relatively steep radial slope and having an interior camming section adjacent said first camming section provided with a relatively gradual radial slope thereby to vary the amount of driving force amplification provided by said actuating cam throughout adjacent portions of the linear movement of said circuit breaker unit with respect to said enclosure unit, and actuating means for rotating said cam.

3. A drawout electric switchgear mechanism comprising, an enclosure unit and a circuit breaker unit mounted for relative reciprocal movement to provide for insertion and withdrawal of said circuit breaker unit with respect to said enclosure, a pair of spring loaded relatively reciprocably movable cooperating disconnect contacts mounted upon said circuit breaker and enclosure units respectively, a rotatable actuating cam pivotally mounted upon one said unit and having a generally involute open-ended camming slot provided therein, a pin fixedly mounted upon the other said unit and disposed for engagement in said slot in driving relation thereby to provide linear travel of said circuit breaker unit with respect to said enclosure unit as said cam is rotated, said generally involute slot having a first camming section adjacent said open end operable over a portion of said travel prior to engagement of said disconnect contacts wherein the radial slope of the camming surface is relatively steep and having a second camming section adjacent said first section operable over a portion of said travel during engagement of said spring-loaded disconnect contacts wherein the radial slope of the camming surface is relatively small, whereby an increased force amplification factor is provided when said disconnect contacts are engaged, and actuating means for rotating said actuating cam.

4. A drawout electric switchgear mechanism comprising a fixed enclosure, a pair of spring-loaded disconnect contacts fixedly mounted upon said enclosure, a circuit breaker unit slidably mounted for reciprocal movement into and out of said enclosure, a second pair of disconnect contacts mounted upon said unit and disposed for cooperation with said first pair of disconnect contacts, a rotatable actuating cam pivotally mounted upon said circuit breaker unit and having a generally involute open-ended camming slot provided therein, a pin fixedly mounted upon said enclosure and disposed for engagement in said slot in driving relation thereby to provide linear travel of said circuit breaker unit to engage and disengage said cooperating disconnect contacts as said cam is rotated, said generally involute slot having a first camming section adjacent said open end circular about a first eccentric center and disposed to provide a steep radial slope and having a second interior camming section circular about a second eccentric center and disposed to provide a gradual radial slope, said first camming section being operable over a portion of unit travel prior to engagement of said disconnect contacts and said second camming section being operable over a portion of unit travel during engagement of said contacts, and a manually operable member for rotating said actuating cam.

5. A drawout electric switchgear mechanism comprising, an enclosure unit and a circuit breaker unit mounted for relative reciprocal movement to provide for insertion and withdrawal of said circuit breaker unit with respect to said enclosure, a pair of spring-loaded relatively reciprocably movable cooperating disconnect contacts mounted upon said circuit breaker and enclosure units respectively, a rotatable actuating cam pivotally mounted upon one said unit and having a generally involute open-ended camming slot provided therein, a pin fixedly mounted upon the other said unit and disposed for engagement in said slot in driving relation thereby to provide linear travel of said circuit breaker unit with respect to said enclosure unit as said cam is rotated, said generally involute slot having a first camming section adjacent said open end operable over a portion of said travel prior to engagement of said disconnect contacts wherein the radial slope of the camming surface is relatively steep to provide a relatively small force amplification for driving said circuit breaker unit with respect to said enclosure unit, a second camming section adjacent said first section operable over a portion of said travel during engagement of said spring-loaded disconnect contacts wherein the radial slope of the camming surface is relatively small to provide an increased force amplification factor, and a transposition portion between said first and second camming section operable upon engagement of said disconnect contacts wherein the radial slope of the camming surface is equal to zero, and actuating means for rotating said cam.

6. A drawout mechanism for an electric circuit breaker having a movable trip member comprising an enclosure unit and a circuit breaker unit mounted for reciprocal movement to provide for insertion and withdrawal of said circuit breaker unit with respect to said enclosure unit, said circuit braker unit having means for mounting a circuit breaker thereon, a rotatable actuating cam pivotally mounted at its center of rotation upon one said unit and having a generally involute open-ended camming slot therein, a pin fixedly mounted upon the other said unit and disposed for engagement in said slot in driving relation thereby to provide relative movement of said enclosure and circuit breaker units as said cam is rotated, said generally involute camming slot having at least two adjacent sections of different radial slopes, a final slot section at the closed end of said camming slot being concentric about said center of cam rotation, whereby final rotation of said cam during insertion effects no relative movement of said enclosure and circuit breaker units, an interlock member movably mounted upon one said unit for tripping engagement with a circuit breaker trip member, said cam having means engaging said interlock member to retain said interlock member in tripping engagement with the trip member until the final rotation of said cam through said concentric slot section, and actuating means for rotating said cam.

7. A drawout mechanism for an electric circuit breaker provided with a movable trip member comprising an enclosure unit and a circuit breaker unit mounted for relative reciprocal movement to provide for insertion and withdrawal of said circuit breaker unit with respect to said enclosure, a pair of relatively movable cooperating disconnect contacts mounted upon said enclosure and circuit breaker units respectively, said circuit breaker unit having means for mounting a circuit breaker thereon, a rotatable actuating cam pivotally mounted upon one said unit and having a generally involute open-ended camming slot therein, a pin fixedly mounted upon the other said unit and disposed for engagement in said slot in driving relation thereby to provide linear travel of said circuit breaker unit with respect to said enclosure unit as said cam is rotated, said generally involute camming slot having a plurality of adjacent sections of different radial slopes, a final slot section at the closed end of said camming slot having a radial slope of zero, whereby rotation of said cam while said final slot section is engaged with said pin effects no linear travel of said circuit breaker unit with respect to said enclosure unit, the remainder of said camming slot between said open end and said final slot section having at least one radial slope other than zero, whereby rotation of said cam while said remainder of said slot is engaged with said pin will drive said circuit breaker unit with respect to said enclosure unit between a position wherein said disconnect contacts are entirely disengaged and a position wherein said disconnect contacts are fully engaged, an interlock member movably mounted upon one said unit for tripping engagement with a circuit breaker trip member, said actuating cam having holding means engaging said interlock member to maintain said interlock member in tripping engagement with the trip member, said holding means disengaging said interlock member while said circuit breaker and enclosure units are in said position wherein said disconnect contacts are fully engaged and wherein rotation of said cam effects no linear travel of said circuit breaker and enclosure units, and actuating means for rotating said actuating cam.

8. A drawout mechanism for an electric circuit breaker including a movable trip member comprising a fixed enclosure having a pair of spring-loaded disconnect contacts fixedly mounted thereon, a circuit breaker unit slidably mounted for reciprocal movement into and out of said enclosure and having mounted thereon said circuit breaker and a second pair of disconnect contacts arranged for cooperation with said first pair of disconnect contacts, a rotatable actuating cam pivotally mounted at its center of rotation upon said circuit breaker unit and having a generally involute open-ended camming slot provided therein, a pin fixedly mounted upon said enclosure and disposed for engagement in said slot in driving relation thereby to provide linear travel of said circuit breaker unit to engage and disengage said pairs of disconnect contacts as said cam is rotated, said generally involute camming slot having a plurality of adjacent sections of different radial slopes, a final closed end section of said slot being concentric about said center of cam rotation, whereby rotation of said actuating cam effects no linear travel of said circuit breaker unit, a remaining surface of said camming slot between said open end and said final section having at least one radial slope other than zero, whereby rotation of said actuating cam provides said travel of said circuit breaker unit, an interlock member movably mounted upon said circuit breaker unit and engageable with the trip member of said circuit breaker to trip said circuit breaker, said actuating cam having holding means engaging said interlock member to retain said interlock member in its tripped position during said travel of said circuit breaker unit, said holding means releasing said interlock member during rotation of said actuating cam through said final concentric slot section wherein said cooperating disconnect contacts are engaged, and a manually operable member for rotating said actuating cam.

9. A drawout mechanism for an electric circuit breaker having a movable switch member comprising an enclosure unit and a circuit breaker unit mounted for relative reciprocal movement to provide for insertion and withdrawal of said circuit breaker unit with respect to said enclosure unit, said circuit breaker unit having means for mounting a circuit breaker thereon, a rotatable actuating cam pivotally mounted upon one said unit, a pin fixedly mounted upon the other said unit and disposed for engagement with said cam in driving relation thereby to provide relative movement of said enclosure and circuit breaker units as said cam is rotated, an actuating member to effect rotation of said cam, and a movable interlock member mounted upon said circuit breaker unit in slidable engaging relationship with the circuit breaker switch member, said interlock member being disposed for pivotal movement to a position wherein said interlock member directly blocks effective operation of said actuating member in response to circuit closing movement of the circuit breaker switch member, whereby relative movement of said enclosure and circuit breaker units is prevented as long as the circuit breaker is in its closed circuit position.

10. A drawout mechanism for an electric circuit breaker having a movable switch member comprising an enclosure unit and a circuit breaker unit mounted for relative reciprocal movement to provide for insertion and withdrawal of said circuit breaker unit with respect to said enclosure, said circuit breaker unit having means for mounting a circuit breaker thereon, a rotatable actuating cam pivotally mounted upon one said unit, a pin fixedly mounted upon the other said unit and disposed for engagement with said cam in driving relation, a manually operable member disposed to effect rotation of said cam, and a movable interlock member mounted upon said circuit breaker unit in slidable engaging relationship with a circuit breaker switch member and actuated by said switch member into the path of movement of said manually operable member to prevent effective operation of said manually operable member whenever the circuit breaker is in closed circuit position.

11. A drawout mechanism for an electric circuit breaker provided with a movable switch member comprising an enclosure unit and a circuit breaker unit mounted for relative reciprocal movement to provide for insertion and withdrawal of said circuit breaker unit with respect to said enclosure unit, a rotatable actuating cam pivotally mounted upon one said unit, a pin fixedly mounted upon the other said unit and disposed for engagement with said cam in driving relation, a manually operable oscillating member disposed to effect progressive step by step rotation of said actuating cam, said circuit breaker unit including means for mounting said electric circuit breaker thereon, and a movable interlock member mounted upon said circuit breaker unit in slidable engaging relationship with the circuit breaker switch member, said interlock member being actuated by the switch member to a position wherein said interlock member directly blocks effective oscillation of said manually operable member whenever said switch member is in closed circuit position, thereby to prevent effective rotation of said actuating cam.

12. A drawout mechanism for an electric circuit breaker having a movable switch member comprising an enclosure unit and a circuit breaker unit mounted for reciprocal movement to provide for insertion and withdrawal of said circuit breaker unit with respect to said enclosure unit, said circuit breaker unit having means for mounting a circuit breaker thereon, a rotatable actuating cam pivotally mounted at its center of rotation upon one said unit and having a generally involute open-ended camming slot therein, a pin fixedly mounted upon the other said unit and disposed for engagement in said slot in driving relation thereby to provide relative movement of said enclosure and circuit breaker units as said cam is rotated, said generally involute camming slot having at least two adjacent sections of different radial slopes, a final slot section at the closed end of said camming slot being concentric about said center of cam rotation, whereby initial rotation of said cam during withdrawal effects no relative movement of said enclosure and circuit breaker units, actuating means to effect rotation of said cam, and a movable interlock member mounted upon said circuit breaker unit and actuated by a circuit breaker switch member to limit the rotation of said cam by said actuating means to a portion of said final slot section whenever the circuit breaker is in closed circuit position.

13. A drawout mechanism for an electric circuit breaker with a movable switch member comprising a fixed enclosure, a circuit breaker unit slidably mounted for reciprocal movement into and out of said enclosure and provided with means for mounting a circuit breaker thereon, a rotatable actuating cam pivotally mounted upon said circuit breaker unit, a pin fixedly mounted upon said enclosure and disposed for engagement with said cam in driving relation thereby to provide linear travel of said circuit breaker unit into and out of said enclosure as said cam is rotated, a manually operable oscillating member movably mounted on said circuit breaker unit and connected to effect progressive step by step rotation of said actuating cam, and an interlock member movably mounted upon said circuit breaker unit in slidable engaging relationship with a circuit breaker switch member and actuated by said switch member into the path of oscillation of said manually operable member thereby to prevent said linear travel of said circuit breaker unit whenever the circuit breaker is in a closed circuit position.

14. A drawout mechanism for an electric circuit breaker having a movable switch member and a movable trip member, comprising an enclosure unit and a circuit breaker unit mounted for relative reciprocal movement to provide for insertion and withdrawal of said circuit breaker unit with respect to said enclosure, said circuit breaker unit including means for mounting said electric circuit breaker thereon, a rotatable actuating cam pivotally mounted upon one said unit and having a generally involute open-ended camming slot therein, a pin fixedly mounted upon the other said unit and disposed for engagement in said slot in driving relation thereby to provide relative movement of said enclosure and circuit breaker units as said cam is rotated, said generally involute slot having a plurality of adjacent camming sections of different radial slopes, a first camming section of said generally involute slot adjacent said open end having a first radial slope, a second interior camming section of said slot adjacent said first section having a second radial slope, a final closed end slot section having a zero radial slope, an actuating means for rotating said cam, a first interlock member movably mounted upon one said unit for tripping engagement with said trip member, said cam having means engaging said first interlock member to retain said first interlock member in tripping engagement with said trip member until rotation of said cam through said final slot section, and a second movable interlock member mounted upon said circuit breaker unit and actuated by said switch member to prevent effective operation of said actuating means thereby to prevent relative movement of said enclosure and circuit breaker units whenever said switch member is in closed circuit position.

15. A drawout electric switchgear mechanism comprising a fixed enclosure having a pair of spring-loaded disconnect contacts fixedly mounted thereon, a circuit breaker unit slidably mounted for reciprocal movement into and out of said enclosure and having mounted thereon a second pair of disconnect contacts cooperable with said first pair of disconnect contacts, an electric circuit breaker mounted upon said circuit breaker unit and having a movable trip member and a movable switch member, a rotatable actuating cam pivotally mounted at its center of rotation upon said circuit breaker unit and having a generally involute open-ended camming slot provided therein, a pin fixedly mounted upon said enclosure and disposed for engagement in said slot in driving relation thereby to provide linear travel of said circuit breaker unit to engage and disengage said pairs of disconnect contacts as said cam is rotated, a manually operable member mounted upon said circuit breaker unit and connected to effect rotation of said actuating cam, said generally involute camming slot having a first camming section adjacent said open end disposed to provide a steep radial slope and being operable over a portion of said travel prior to engagement of said disconnect contacts, a second interior camming section of said camming slot adjacent said first section disposed to provide a gradual radial slope and being operable over a portion of said travel during engagement of said disconnect contacts, a final closed end slot section of said camming slot concentric about said center of cam rotation to provide a zero radial slope whereby rotation of said actuating cam effects no linear travel of said circuit breaker unit, a first interlock member movably mounted upon said circuit breaker unit and engageable with said trip member to trip said circuit breaker, said actuating cam having holding means to retain said first interlock member in its tripped position during said travel and to release said first interlock member during rotation of said actuating cam through said final concentric slot section, and a second interlock member movably mounted upon said circuit breaker unit and actuated by said switch member to interfere with normal operation of said manually operable member thereby to prevent said travel whenever said switch member is in closed circuit position.

References Cited in the file of this patent

UNITED STATES PATENTS

| | | |
|---|---|---|
| 451,702 | Sims | May 5, 1891 |
| 1,448,383 | Brown | Mar. 13, 1923 |
| 1,632,592 | French | June 14, 1927 |
| 1,729,864 | Brown | Oct. 1, 1929 |
| 1,768,535 | Ainsworth | July 1, 1930 |
| 2,544,314 | Hebbel | Mar. 6, 1951 |
| 2,554,510 | Spicer | May 29, 1951 |
| 2,702,324 | Donaldson | Feb. 15, 1955 |

FOREIGN PATENTS

| | | |
|---|---|---|
| 86,655 | Sweden | June 23, 1936 |